J. L. THURSTON, DEC'D.
E. L. THURSTON, ADMINISTRATOR.
FAUCET.
APPLICATION FILED NOV. 22, 1909.

953,186.

Patented Mar. 29, 1910.

UNITED STATES PATENT OFFICE.

JOHN L. THURSTON, DECEASED, LATE OF BOSTON, MASSACHUSETTS; EDWIN LANGDON THURSTON ADMINISTRATOR OF SAID JOHN L. THURSTON, DECEASED.

FAUCET.

953,186.  Specification of Letters Patent.  Patented Mar. 29, 1910.

Application filed November 22, 1909. Serial No. 529,423.

*To all whom it may concern:*

Be it known that JOHN L. THURSTON, late of Boston, in the county of Suffolk and State of Massachusetts, deceased, did invent certain new and useful Improvements in Faucets, of which the following is a specification.

This invention relates to a faucet, the casing of which has a valve chamber, an outlet nozzle in alinement therewith, and an inlet communicating with the valve chamber, a valve seat being provided between the inlet and outlet, and a valve being located in the valve chamber and raised from said seat to permit the passage of liquid through the casing by a cam mounted on a shaft journaled in the outlet nozzle.

The invention has for its object to provide certain improvements in the details of construction of a valve of this character looking to the convenient and ready assemblage and separation of the parts.

The invention consists in the improvements which I will now proceed to describe and claim.

Figure 1:
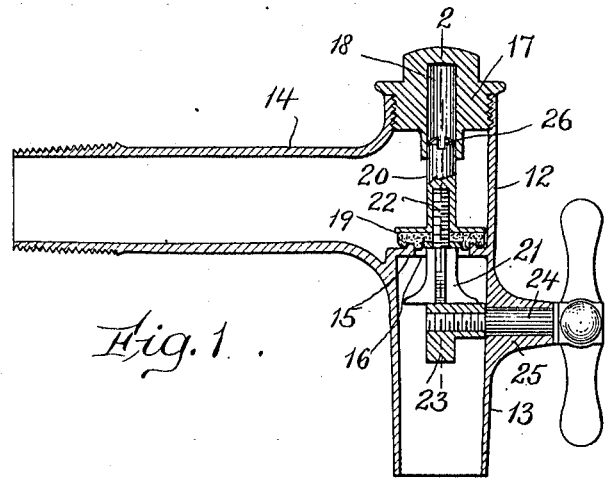
Figure 2:
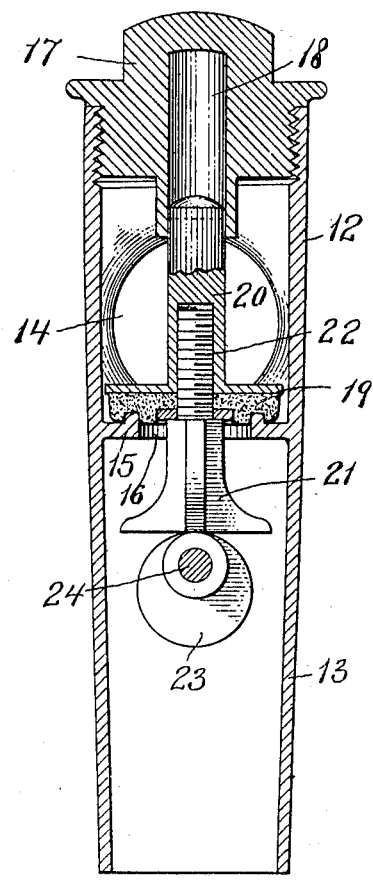

Of the accompanying drawings, forming a part of this specification,—Figure 1 represents a longitudinal section of a faucet embodying the invention. Fig. 2 represents a section on an enlarged scale on line 2—2 of Fig. 1.

The same reference characters indicate the same parts in all the figures.

The casing of the improved faucet includes a valve chamber 12, a discharge nozzle 13 in alinement with the valve chamber, an inlet 14 communicating with the valve chamber, and a valve seat 15 between the inlet and outlet, said valve seat being an inwardly projecting flange surrounding an opening 16 through which water passes when the valve, hereinafter described, is open. The upper end of the valve chamber 12 is provided with an internally screw threaded opening in which is detachably secured an externally threaded plug 17 which closes said opening, and is provided with a longitudinal socket 18 forming a guide for the stem of the valve, said guide being in alinement with the longitudinal center of the valve chamber, the valve seat, and outlet nozzle.

19 represents a valve which is located in the chamber 12, and is adapted to be seated on the valve seat 15, and close the opening 16. The valve is provided with a stem 20 having a sliding fit in the guide 18, said guide and stem maintaining the valve in a position parallel with the valve seat.

21 represents a foot which is secured to the valve and projects therefrom downwardly through and below the opening 16. Said foot is provided with a screw threaded shank 22 which engages an internally threaded socket in the valve stem 20, provision being thus made for detachably connecting the foot with the valve.

23 represents a cam, the hub of which is internally screw threaded, and engages the threaded inner end portion of a shaft 24 which is journaled in a bearing 25 formed on one side of the nozzle 13. The relative arrangement of the cam, foot, valve, and valve seat is such that when the cam is in the position shown in Figs. 1 and 2, the valve is allowed to close on its seat where it is held by the liquid pressure above it. A partial rotation of the cam from the position shown, causes it to impart upward motion through the foot 21 to the valve, thus raising the same and permitting the flow of liquid through the opening 16.

The foot 21 is provided with a reduced upper portion of smaller size than the diameter of the opening 16, and an enlarged lower portion which is larger than said diameter, so that the lower portion of the foot cannot pass through the opening 16, but abuts against the under side of the valve seat when the valve is fully opened, and thus constitutes a stop which limits the opening movement of the valve. The foot is preferably composed of a series of wings or flanges radiating from a common center, so that when the enlarged outer portion of the foot bears on the under side of the valve seat, liquid can still flow between the adjacent wings.

The described construction permits the parts to be assembled as follows: The plug 17 being removed, the foot 21 is inserted in the outlet nozzle 13 with its shank 22 projecting through the valve seat into the valve chamber. The valve is then inserted through the opening occupied by the plug 17, and screwed to place on the shank 22, the stem being provided in its outer end with a slot 26 to engage a screw-driver. The cam 23 may now be inserted in the nozzle 13, and held by a suitable tool in position to receive the screw threaded end of the shaft 24 which is inserted in its bearing and turned until the shaft and cam are properly connected. The plug 17 may be inserted either before or after the insertion of the cam 23. The operation of separating the described parts will be obvious without further description.

I claim:

A faucet comprising a casing having a valve chamber, a discharge nozzle in alinement with the valve chamber, a valve seat between the valve chamber and outlet nozzle, and an inlet above the valve seat, one end of the valve chamber having an opening and a removable plug which closes said opening, and is provided with a guide in alinement with the longitudinal axis of the chamber, a valve movable in the valve chamber and having a stem which is movable in said guide, a foot projecting below the valve and through the valve seat, said foot having a reduced upper portion smaller than the diameter of the passage through the valve seat, and an enlarged lower portion larger than said diameter, and a shaft journaled in one side of the outlet nozzle, and having a cam detachably secured to it within said nozzle, and arranged to bear on said foot and impart motion therethrough to the valve, the foot and valve being provided with means whereby they may be detachably connected within the casing.

In testimony whereof, I, EDWIN LANGDON THURSTON, administrator of the estate of the said JOHN L. THURSTON, deceased, have affixed my signature, in presence of two witnesses.

EDWIN LANGDON THURSTON,
*Administrator of the estate of John L. Thurston, deceased.*

Witnesses:
C. F. BROWN,
P. W. PEZZETI.